US012195281B1

(12) United States Patent
Cox

(10) Patent No.: US 12,195,281 B1
(45) Date of Patent: Jan. 14, 2025

(54) TAIL PULLEY AND BELT SAVER

(71) Applicant: Josh Cox, Moroni, UT (US)

(72) Inventor: Josh Cox, Moroni, UT (US)

(*) Notice: Subject to any disclaimer, the term of this patent is extended or adjusted under 35 U.S.C. 154(b) by 142 days.

(21) Appl. No.: 18/094,324

(22) Filed: Jan. 6, 2023

(51) Int. Cl.
*B65G 23/04* (2006.01)

(52) U.S. Cl.
CPC ................................ *B65G 23/04* (2013.01)

(58) Field of Classification Search
None
See application file for complete search history.

(56) References Cited

U.S. PATENT DOCUMENTS

| | | | | |
|---|---|---|---|---|
| 1,217,371 A | * | 2/1917 | Vestine | F16H 55/30 474/96 |
| 1,758,280 A | * | 5/1930 | Evans | B65G 39/02 492/38 |
| 4,230,222 A | | 10/1980 | Clark | |
| 4,402,390 A | * | 9/1983 | Feeney | B65G 39/04 474/96 |
| 4,506,559 A | * | 3/1985 | Francke | F16H 55/46 74/439 |
| 5,057,058 A | * | 10/1991 | Crudup | F16H 55/46 474/95 |
| 5,117,970 A | * | 6/1992 | Gibbs | B65G 39/07 198/842 |
| 5,279,526 A | * | 1/1994 | Gundlach | B65G 23/06 474/96 |
| 5,868,036 A | * | 2/1999 | Salzman | F16H 55/38 476/72 |
| 6,910,571 B1 | * | 6/2005 | Ertel | B65G 21/105 492/38 |
| 7,367,277 B2 | | 5/2008 | Bowman | |
| 7,866,462 B2 | | 1/2011 | DeMong | |
| 8,833,539 B2 | | 9/2014 | Fehr et al. | |
| 9,670,003 B2 | | 6/2017 | Ferguson | |
| 10,017,328 B1 | | 7/2018 | Wolf et al. | |
| 10,358,297 B2 | | 7/2019 | Fehr et al. | |
| 11,685,609 B2 | * | 6/2023 | Brown, Sr. | F16H 55/171 198/834 |

* cited by examiner

*Primary Examiner* — Kavel Singh
(74) *Attorney, Agent, or Firm* — Cramer Patent & Design PLLC; Aaron R. Cramer

(57) ABSTRACT

The tail pulley and belt saver may couple to a shaft of a tail pulley in order to keep a belt of a conveyor on the tail pulley. As a non-limiting example, the end of the conveyor may comprise a non-driven pulley commonly referred to as the tail pulley. Due to excessive wear, uneven wear, misalignment, and other factors, the belt may tend to travel to one side of the tail pulley or the other. The tail pulley and belt saver may be coupled to the shaft of the tail pulley in order to keep the belt on the tail pulley. The tail pulley and belt saver may reduce damage to the belt and the tail pulley that may occur when the belt travels laterally on the tail pulley.

13 Claims, 7 Drawing Sheets

TAIL PULLEY AND BELT SAVER

RELATED APPLICATIONS

None.

FIELD OF THE INVENTION

The present invention relates generally to a tail pulley and more specifically to a tail pulley and belt saver.

BACKGROUND OF THE INVENTION

Material belt conveyors are used in a wide variety of industries including mining, quarry, power/sand plant, cement, coal, port, and the like. An important part of the material conveyor is the tail pulley. It is typically located at the end of the belt where the material is loaded and is used to change the running direction of conveyor belt. The tail pulley is contained within the belt and helps it to rotate freely around the ends of the conveyor. It is generally free spinning, with bearings mounted either inside or on the ends of the tail pulley. The tail pulley utilizes a belt for operation.

Unfortunately, should the tail pulley become worn, operation becomes erratic and leads to premature failure of the entire conveyor system. Accordingly, there exists a need for a means by which tail pulleys on a conveyor can be protected and/or repaired to keep the belt on the tail pully and prevent premature failure. The development of the tail pulley and belt saver fulfills this need.

SUMMARY OF THE INVENTION

The inventor has recognized the aforementioned inherent problems and lack in the art and observed that there is a need for a tail pulley and belt saver has an annular plate having a first component and a second component, the annular plate includes a circular metal plate having a central aperture is adapted to receive a shaft of a tail pulley in order to keep a belt of a conveyor on the tail pulley, and an annular ring coupled to the annular plate, the annular ring includes a central aperture adapted to receive the shaft of the tail pulley in order to keep the belt of the conveyor on the tail pulley, the annular ring includes an outside diameter and an inner diameter.

The first component and the second component may be positioned around the shaft and are fastened together with a plurality of fasteners. The tail pulley and belt saver may be added to the shaft without requiring disassembly of the tail pulley from the conveyor. The tail pulley and belt saver may be positioned on the shaft such that the annular plate is adjacent to the tail pulley and the annular ring is on the opposite side of the annular plate from the tail pulley. The diameter of the annular plate includes a first diameter, and the diameter of the central aperture includes a second diameter.

The second diameter may be smaller than the first diameter. The first diameter may have a tolerance of 6 inches with an error of one inch. The outside diameter of the annular ring may have a third diameter that is larger than the second diameter. The outside diameter of the annular ring may include a fourth diameter larger than the third diameter. The fourth diameter may be smaller than the first diameter. The inner ring may be a portion of the annular ring between the second diameter and the third diameter, and the outer ring refers to a portion of the annular ring that exist between the third diameter and the fourth diameter.

A first ring segment may be a portion of the outer ring located on a top half of the tail pulley and belt saver and is bounded by a first bisector, a second bisector, the circumference of the circular metal plate having the third diameter, and the circumference of the circular metal plate having the fourth diameter. A second ring segment may be a portion of the inner ring located on the top half of the tail pulley and belt saver and is bounded by the first bisector, the second bisector, the circumference of the circular metal plate having the second diameter, and the circumference of the circular metal plate having the third diameter.

A third ring segment may be a portion of the outer ring located on a bottom half of the tail pulley and belt saver and is bounded by the first bisector, the second bisector, the circumference of the circular metal plate having the third diameter, and the circumference of the circular metal plate having the fourth diameter. A fourth ring segment may be a portion of the inner ring located on the bottom half of the tail pulley and belt saver and bounded by the first bisector, the second bisector, the circumference of the circular metal plate having the second diameter, and the circumference of the circular metal plate having the third diameter.

A fifth ring segment may be a portion of the inner ring located on a first half of the tail pulley and belt saver and is bounded by the first bisector, the second bisector, the circumference of the circular metal plate having the second diameter, and the circumference of the circular metal plate having the second diameter. A sixth ring segment may be a portion of the inner ring and the outer ring located on the first half of the tail pulley and belt saver is bounded by the first bisector, the second bisector, the circumference of the circular metal plate having the second diameter, and the circumference of the circular metal plate having the second diameter. The central aperture of the annular ring may have an equal diameter as the central aperture of the annular plate. The annular ring may be a toroidal ring coupled to the annular plate. The tail pulley and belt saver may be adapted to reduce damage to the belt of the conveyor and the tail pulley that occurs when the belt travels laterally on the tail pulley.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
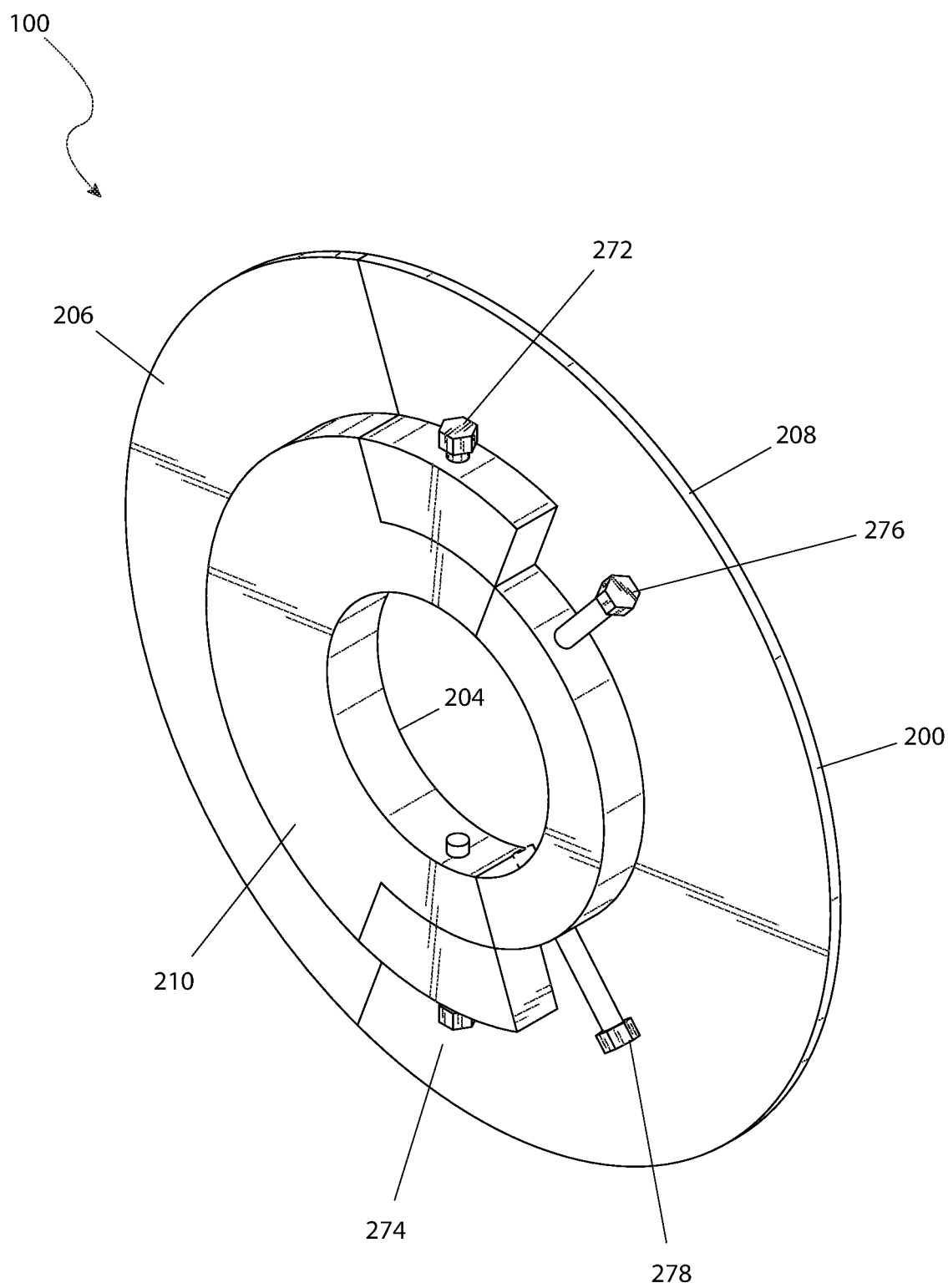
FIG. 1 is a front isometric view of a tail pulley and belt saver, according to an embodiment of the present invention.
Figure 2:
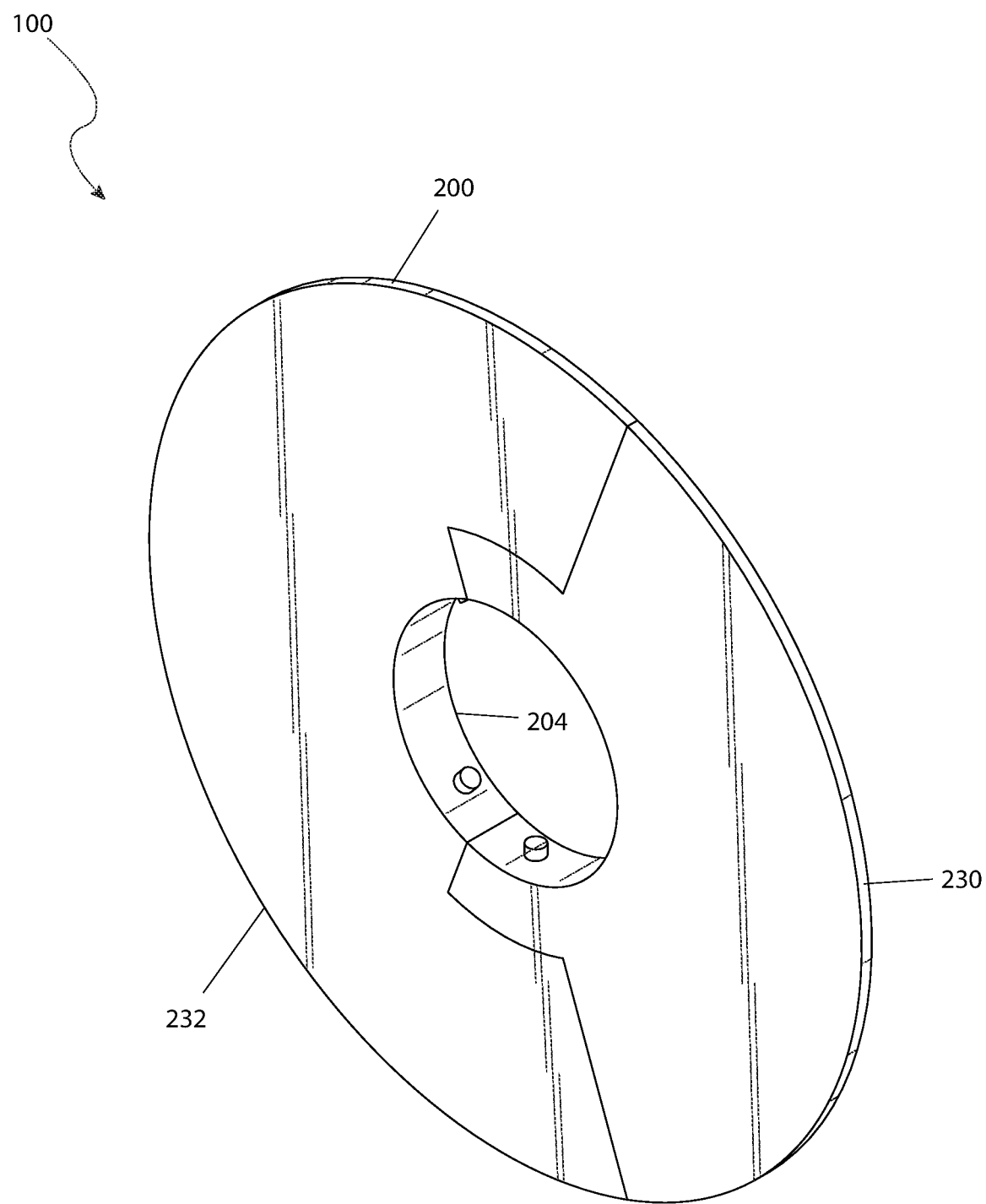
FIG. 2 is a rear isometric view of a tail pulley and belt saver, according to an embodiment of the present invention.

DESCRIPTIVE KEY 100 tail pulley and belt saver
200 annular plate
204 central aperture
206 first component
208 second component
210 annular ring
212 inner ring
216 outer ring
220 first bisector
222 second bisector
230 first plate segment
232 second plate segment
240 first ring segment
242 second ring segment
244 third ring segment
246 fourth ring segment
248 fifth ring segment
250 sixth ring segment
272 first fastener
274 second fastener
276 third fastener
278 fourth fastener
280 separation angle
290 first diameter
292 second diameter
294 third diameter
296 fourth diameter
900 conveyor
901 tail pulley
902 shaft
903 belt

DESCRIPTION OF THE INVENTION

Figure 9:
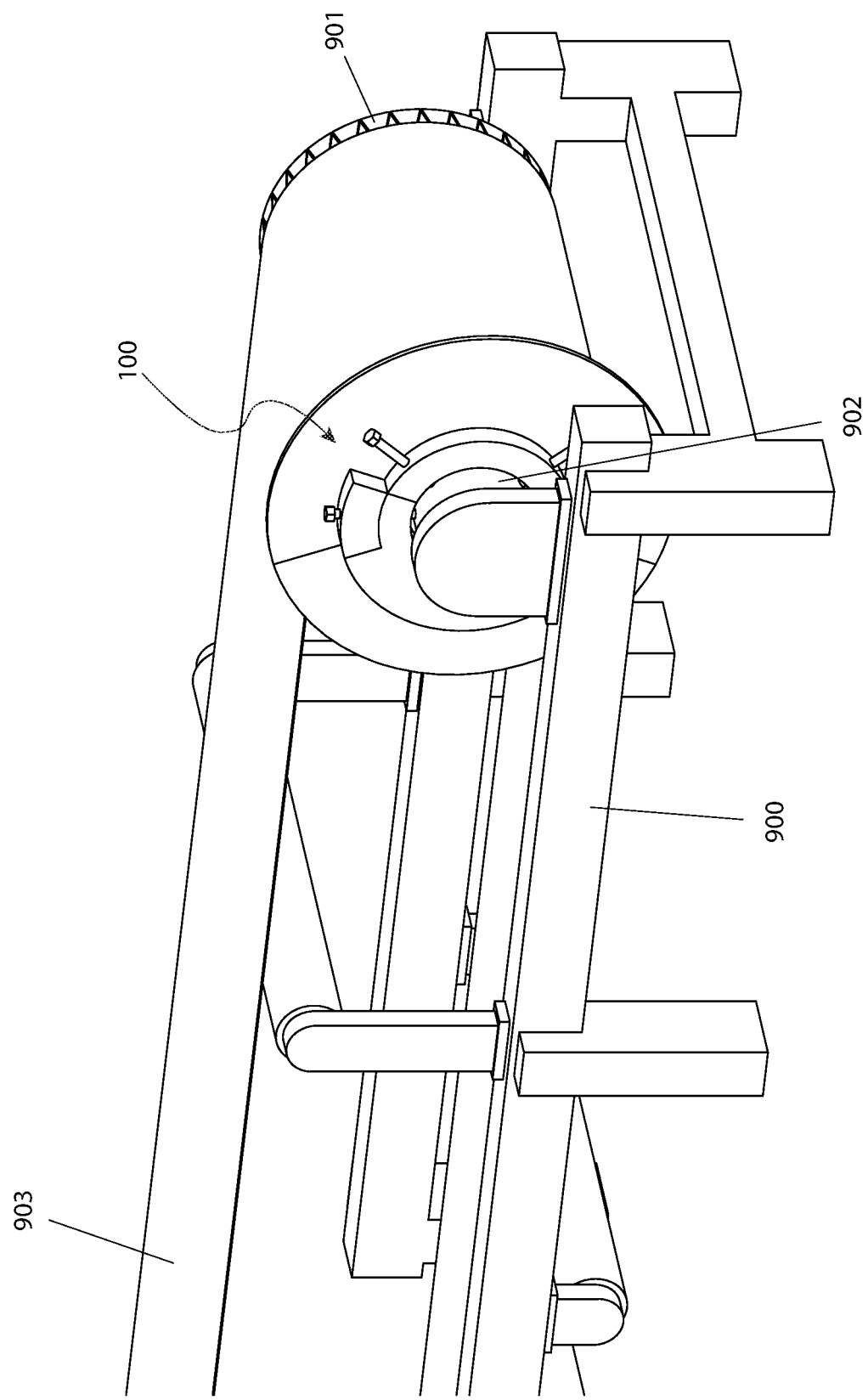
FIG. 9 is an environmental view of a tail pulley and belt saver installed on a shaft of a tail pulley of an exemplary conveyor, according to an embodiment of the present invention.

The present invention is directed to a tail pulley and belt saver (herein described as the "invention") 100. The invention 100 may couple to a shaft 902 of a tail pulley 901 in order to keep a belt 903 of a conveyor 900 on the tail pulley 901. As a non-limiting example, the end of the conveyor 900 may comprise a non-driven pulley commonly referred to as the tail pulley 901. Due to excessive wear, uneven wear, misalignment, and other factors, the belt 903 may tend to travel to one (1) side of the tail pulley 901 or the other. The invention 100 may be coupled to the shaft 902 of the tail pulley 901 in order to keep the belt 903 on the tail pulley 901. The invention 100 may reduce damage to the belt 903 and the tail pulley 901 that may occur when the belt 903 travels laterally on the tail pulley 901, as seen in an exemplary manner in FIG. 9.

The invention 100 may comprise an annular plate 200 coupled to an annular ring 210. The invention 100 may be separated into a first component 206 and a second component 208 that may be positioned around the shaft 902 and fastened together with fasteners 272, 274, 276, 278 so that the invention 100 may be added to the shaft 902 without requiring disassembly of the tail pulley 901 from the conveyor 900. The invention 100 may be positioned on the shaft 902 such that the annular plate 200 is adjacent to the tail pulley 901 and the annular ring 210 is on the opposite side of the annular plate 200 from the tail pulley 901.

The annular plate 200 may be a circular metal plate comprising a central aperture 204. The diameter of the annular plate 200 may be a first diameter 290. The diameter of the central aperture 204 may be a second diameter 292. The second diameter 292 may be smaller than the first diameter 290. In a preferred embodiment, the first diameter 290 may be six inches with an error of one inch (6.0 inches±1.0 inch). The second diameter 292 may be larger than the diameter of the shaft 902. In embodiments, the invention 100 may be available in different sizes of the second diameter 292 in order to fit multiple sizes of the shafts 902.

The annular ring 210 may be a toroidal ring coupled to the annular plate 200. The central aperture 204 of the annular ring 210 may have the same diameter as the central aperture 204 of the annular plate 200. The outside diameter of the annular ring 210 may vary in steps. The smallest outside diameter of the annular ring 210 may be a third diameter 294. The third diameter 294 may be larger than the second diameter 292. The largest outside diameter of the annular ring 210 may be a fourth diameter 296. The fourth diameter 296 may be larger than the third diameter 294. The fourth diameter 296 may be smaller than the first diameter 290.

Throughout the remainder of this document, inner ring 212 may refer to portions of the annular ring 210 that exist between the second diameter 292 and the third diameter 294 and outer ring 216 may refer to portions of the annular ring 210 that exist between the third diameter 294 and the fourth diameter 296.

A first component 206 and a second component 208 selected from the two (2) components of the invention 100 may separate such that the first component 206 and the second component 208 may be positioned on opposite sides of the shaft 902, brought together to surround the shaft 902, and coupled using the fasteners 272, 274, 276, 278.

The separation of the first component 206 and the second component 208 may be described in terms of two (2) imaginary bisectors. A first bisector 220 may be a plane passing through the center of the invention 100 and oriented to be perpendicular to the annular plate 200. A second bisector 222 may be a plane passing through the center of the invention 100 and oriented to be perpendicular to the annular plate 200. A separation angle 280 between the first bisector 220 from the second bisector 222 may assure that the second bisector 222 is not coplanar with the first bisector 220. In a preferred embodiment, the separation angle 280 may be forty degrees with an error of five degrees (40.0°±5.0°).

The first component 206 and the second component 208 may be divided along a boundary that will now be described. The separation of the annular plate 200 into plate segments may follow the same the boundary as the boundary that separate the first component 206 and the second component 208. Even though the annular ring 210 is coupled to the annular plate 200, the boundary separating the annular ring 210 into ring segments is more complicated and will be described later in this document.

Figure 3:
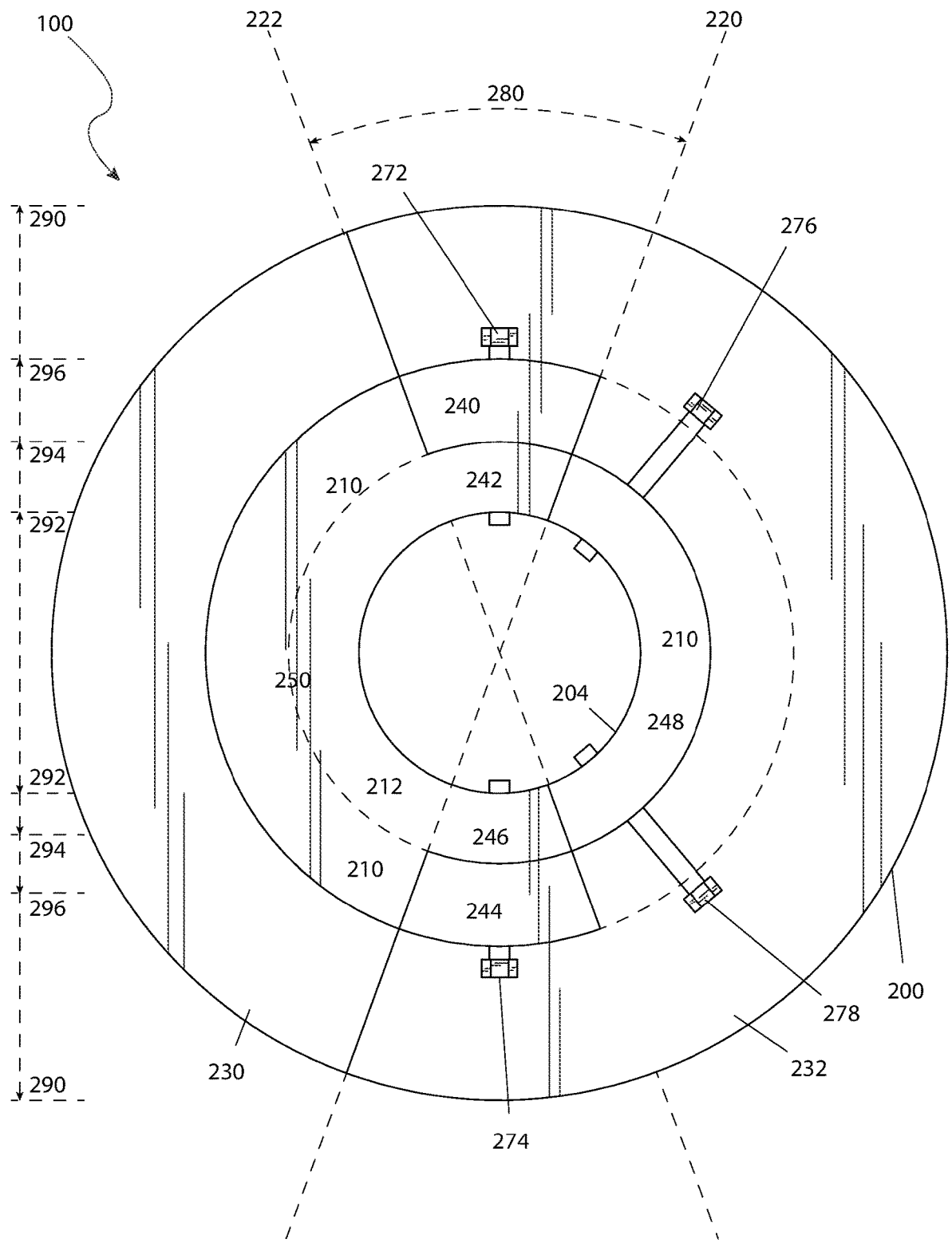
FIG. 3 is a front view of a tail pulley and belt saver, according to an embodiment of the present invention.
Figure 4:
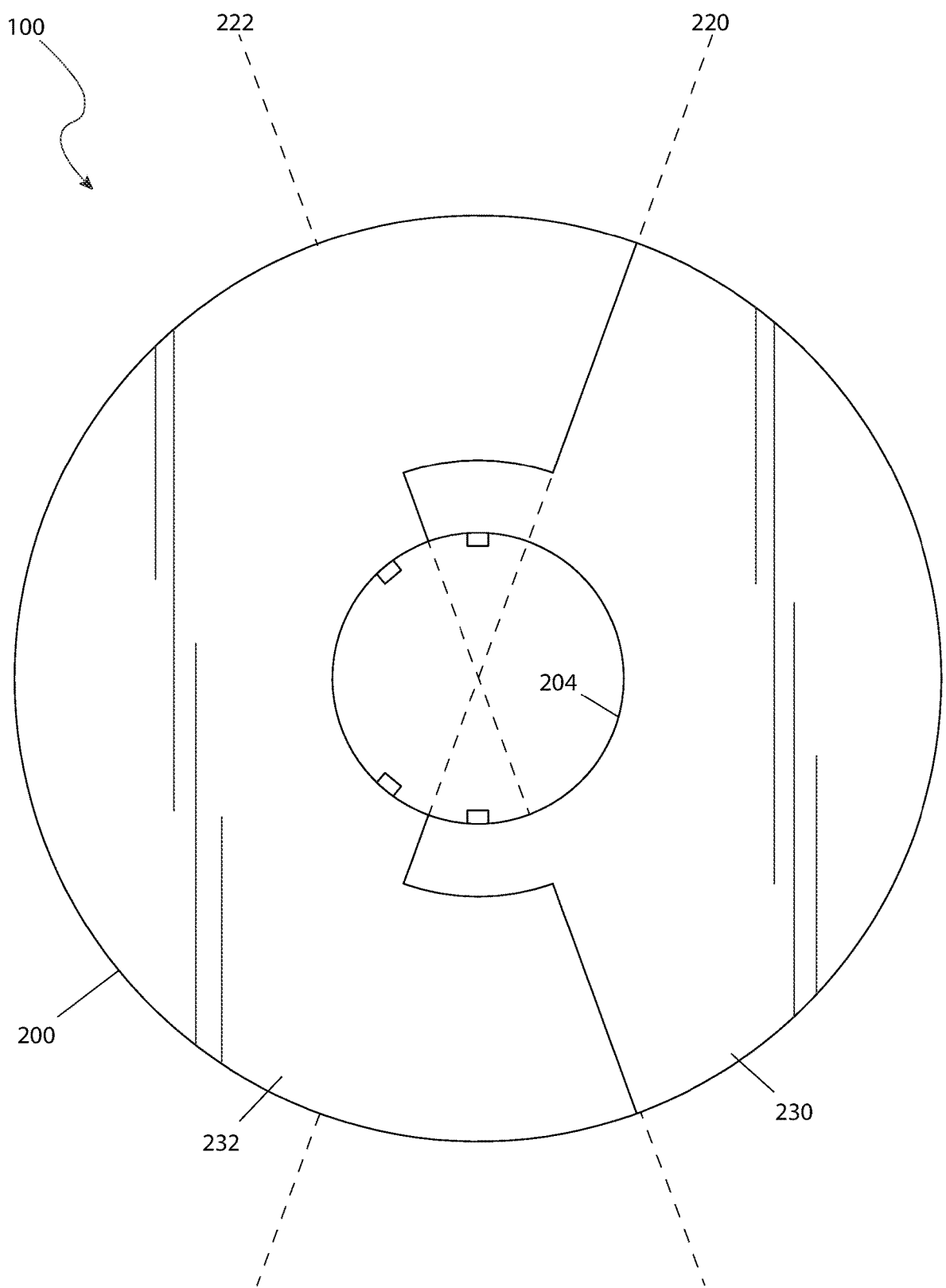
FIG. 4 is a rear view of a tail pulley and belt saver, according to an embodiment of the present invention.
Figure 5:
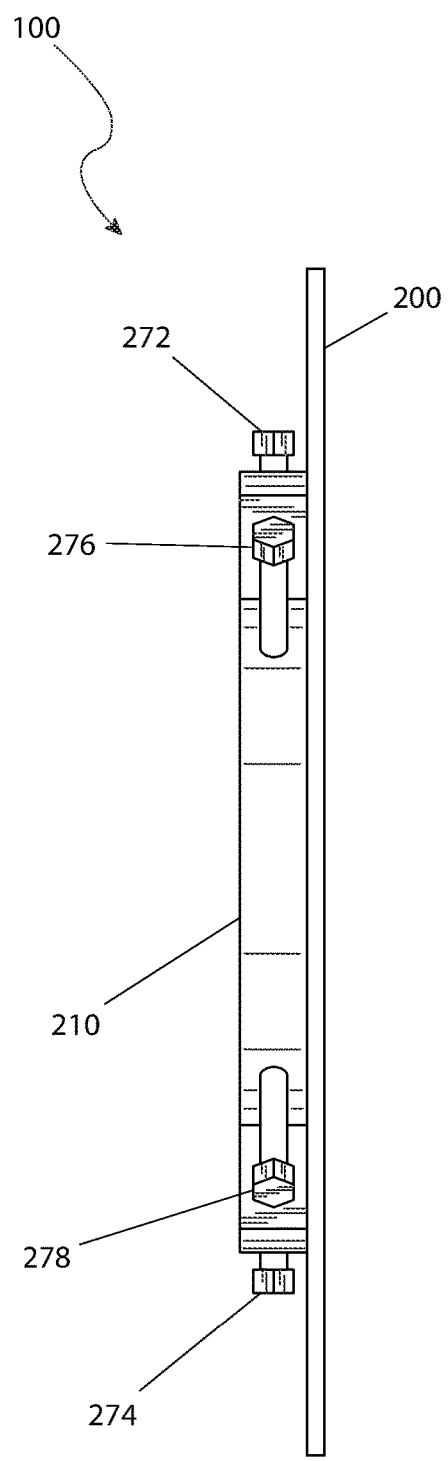
FIG. 5 is a right side view of a tail pulley and belt saver, according to an embodiment of the present invention.
Figure 6:
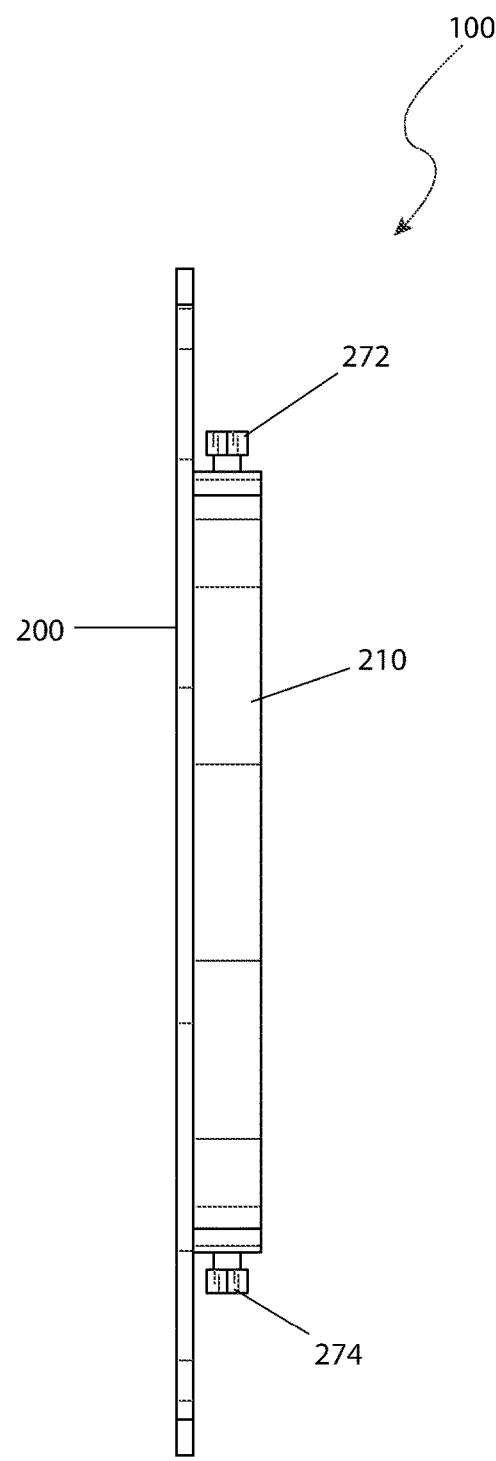
FIG. 6 is a left side view of a tail pulley and belt saver, according to an embodiment of the present invention.
Figure 7:
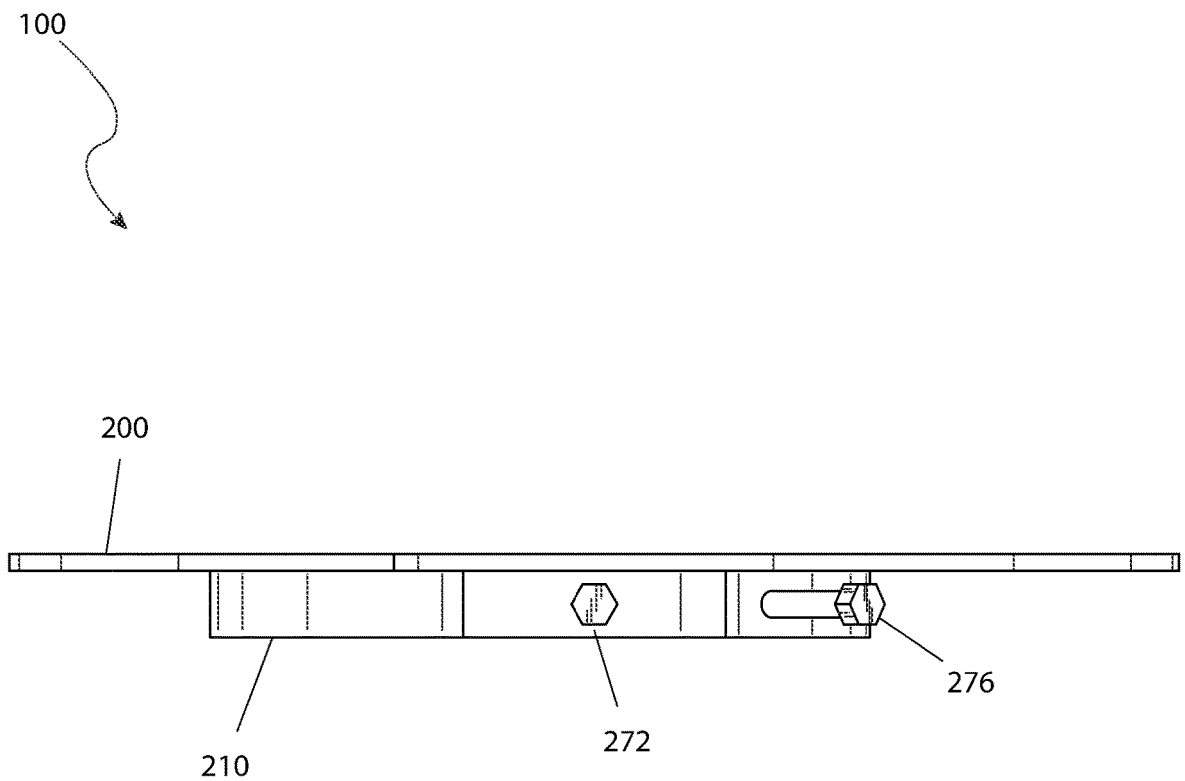
FIG. 7 is a top view of a tail pulley and belt saver, according to an embodiment of the present invention.
Figure 8:
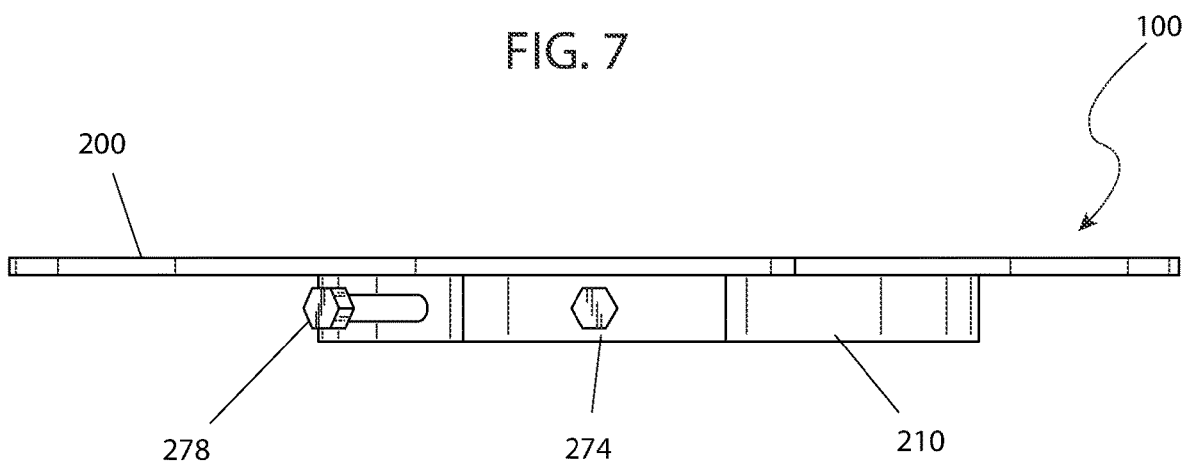
FIG. 8 is a bottom view of a tail pulley and belt saver, according to an embodiment of the present invention.

Referring to FIG. 3, the top half of the boundary for the two (2) components 206, 208 and the plate segments may begin at the top of the annular plate 200 where the first bisector 220 intersects the circumference of the circle having the first diameter 290. The boundary may follow the first bisector 220 towards the center of the annular plate 200 to the circumference of the circle having the third diameter 294 at which point the boundary may turn to the right. The boundary may follow the circumference of the circle having the third diameter 294 to the second bisector 222 at which point the boundary may turn towards the center of the annular plate 200. The boundary may follow the second bisector 222 to the circumference of the circle having the second diameter 292.

The bottom half of the boundary may comprise a mirror-image on the bottom of the annular plate 200. Referring again to FIG. 3, the bottom half of the boundary for the two (2) components and the plate segments may begin at the top of the annular plate 200 where the second bisector 222 intersects the circumference of the circle having the first diameter 290. The boundary may follow the second bisector 222 towards the center of the annular plate 200 to the circumference of the circle having the third diameter 294 at which point the boundary may turn to the right. The boundary may follow the circumference of the circle having the third diameter 294 to the first bisector 220 at which point the boundary may turn towards the center of the annular plate 200. The boundary may follow the first bisector 220 to the circumference of the circle having the second diameter 292.

A first plate segment 230 may comprise the portion of the annular plate 200 located to the left of the boundary described above. A second plate segment 232 may comprise the portion of the annular plate 200 located to the right of the boundary described above. The two (2) components may separate along the boundary.

The annular ring 210 may be divided such that at least a subset of the ring segments located on the first component 206 may align with at least a subset of the ring segments located on the second component 208. The ring segments that so align may be coupled using the plurality of fasteners 272, 274, 276, 278 to secure the invention 100 to the shaft 902.

A first ring segment 240 may be the portion of the outer ring 216 located on the top half of the invention 100 and bounded by the first bisector 220, the second bisector 222, the circumference of the circle having the third diameter 294, and the circumference of the circle having the fourth diameter 296. A second ring segment 242 may be the portion of the inner ring 212 located on the top half of the invention 100 and bounded by the first bisector 220, the second bisector 222, the circumference of the circle having the second diameter 292, and the circumference of the circle having the third diameter 294. When the first component 206 and the second component 208 are assembled together around the shaft 902, the first ring segment 240 may be adjacent to the second ring segment 242 such that a first fastener 272 may pass through coupling apertures located in the first ring segment 240 and the second ring segment 242 to couple the first component 206 to the second component 208.

A third ring segment 244 may be the portion of the outer ring 216 located on the bottom half of the invention 100 and bounded by the first bisector 220, the second bisector 222, the circumference of the circle having the third diameter 294, and the circumference of the circle having the fourth diameter 296. A fourth ring segment 246 may be the portion of the inner ring 212 located on the bottom half of the invention 100 and bounded by the first bisector 220, the second bisector 222, the circumference of the circle having the second diameter 292, and the circumference of the circle having the third diameter 294. When the first component 206 and the second component 208 are assembled together around the shaft 902, the third ring segment 244 may be adjacent to the third ring segment 244 such that a second fastener 274 may pass through the coupling apertures located in the third ring segment 244 and the fourth ring segment 246 to couple the first component 206 to the second component 208.

A fifth ring segment 248 may be the portion of the inner ring 212 located on the right half of the invention 100 and bounded by the first bisector 220, the second bisector 222, the circumference of the circle having the second diameter 292, and the circumference of the circle having the second diameter 292. When the invention 100 is in place around the shaft 902, a third fastener 276 and a fourth fastener 278 may pass through attachment apertures located in the fifth ring segment 248 to couple the invention 100 to the shaft 902.

A sixth ring segment 250 may be the portion of the inner ring 212 and the outer ring 216 located on the left half of the invention 100 and bounded by the first bisector 220, the second bisector 222, the circumference of the circle having the second diameter 292, and the circumference of the circle having the second diameter 292. The sixth ring segment 250 may be adjacent to the second ring segment 242 and the fourth ring segment 246 and, in fact, the sixth ring segment 250, the second ring segment 242, and the fourth ring segment 246 may be contiguous. The second ring segment 242 and the fourth ring segment 246 have been presented separately to emphasize the role that the second ring segment 242 plays by coupling to the first ring segment 240 and the role that the fourth ring segment 246 plays by coupling to the third ring segment 244.

The invention 100 may be used individually on one (1) side of the tail pulley 901 in cases where the belt tends to travel in one (1) direction only. The invention 100 may preferably be used in pairs with one (1) instance of the invention 100 coupled to the shaft 902 on opposite side of the tail pulley 901.

In use, the invention 100 may be coupled to a shaft 902 of a tail pulley 901 by separating the invention 100 into a first component 206 and a second component 208, positioning first component 206 and second component 208 on opposite sides of the shaft 902, bringing the first component 206 and second component 208 together, coupling the first component 206 to the second component 208 using two (2) fasteners 272, 274, and finally coupling the invention 100 to the shaft 902 using two (2) fasteners 276, 278. A second instance of the invention 100 may be so coupled to the shaft 902 on the opposite side of the tail pulley 901.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A tail pulley and belt saver, comprising:
   an annular plate having a first component and a second component, the annular plate includes a circular metal plate having a central aperture is adapted to receive a shaft of a tail pulley in order to keep a belt of a conveyor on the tail pulley;
   an annular ring coupled to the annular plate, the annular ring includes a central aperture adapted to receive the shaft of the tail pulley in order to keep the belt of the conveyor on the tail pulley, the annular ring includes an outside diameter and an inner diameter;

a first ring segment is a portion of the outer ring located on a top half of the tail pulley and belt saver and is bounded by a first bisector, a second bisector, the circumference of the circular metal plate having the third diameter, and the circumference of the circular metal plate having the fourth diameter;

a second ring segment is a portion of the inner ring located on the top half of the tail pulley and belt saver and is bounded by the first bisector, the second bisector, the circumference of the circular metal plate having the second diameter, and the circumference of the circular metal plate having the third diameter;

a third ring segment is a portion of the outer ring located on a bottom half of the tail pulley and belt saver and is bounded by the first bisector, the second bisector, the circumference of the circular metal plate having the third diameter, and the circumference of the circular metal plate having the fourth diameter;

a fourth ring segment is a portion of the inner ring located on the bottom half of the tail pulley and belt save and bounded by the first bisector, the second bisector, the circumference of the circular metal plate having the second diameter, and the circumference of the circular metal plate having the third diameter;

a fifth ring segment is a portion of the inner ring located on a first half of the tail pulley and belt saver and is bounded by the first bisector, the second bisector, the circumference of the circular metal plate having the second diameter, and the circumference of the circular metal plate having the second diameter; and, a sixth ring segment is a portion of the inner ring and the outer ring located on the first half of the tail pulley and belt saver is bounded by the first bisector, the second bisector, the circumference of the circular metal plate having the second diameter, and the circumference of the circular metal plate having the second diameter; and, wherein a diameter of the annular plate includes a first diameter and a diameter of the central aperture includes a second diameter.

2. The tail pulley and belt saver, according to claim 1, wherein the first component and the second component are positioned around the shaft and are fastened together with a plurality of fasteners.

3. The tail pulley and belt saver, according to claim 2, wherein the tail pulley and belt saver is added to the shaft without requiring disassembly of the tail pulley from the conveyor.

4. The tail pulley and belt saver, according to claim 2, wherein the tail pulley and belt saver is positioned on the shaft such that the annular plate is adjacent to the tail pulley and the annular ring is on the opposite side of the annular plate from the tail pulley.

5. The tail pulley and belt saver, according to claim 1, wherein the second diameter is smaller than the first diameter.

6. The tail pulley and belt saver, according to claim 1, wherein the first diameter has a tolerance of 6 inches with an error of 1 inch.

7. The tail pulley and belt saver, according to claim 1, wherein the outside diameter of the annular ring that is a third diameter that is larger than the second diameter.

8. The tail pulley and belt saver, according to claim 7, wherein the outside diameter of the annular ring that includes a fourth diameter larger than the third diameter.

9. The tail pulley and belt saver, according to claim 8, wherein the fourth diameter is smaller than the first diameter.

10. The tail pulley and belt saver, according to claim 8, wherein an inner ring is a portion of the annular ring between the second diameter and the third diameter and an outer ring refers to a portion of the annular ring that exist between the third diameter and the fourth diameter.

11. The tail pulley and belt saver, according to claim 1, wherein the central aperture of the annular ring have an equal diameter as the central aperture of the annular plate.

12. The tail pulley and belt saver, according to claim 1, wherein the annular ring is a toroidal ring coupled to the annular plate.

13. The tail pulley and belt saver, according to claim 1, wherein the tail pulley and belt saver is adapted to reduce damage to the belt of the conveyor and the tail pulley that occurs when the belt travels laterally on the tail pulley.

* * * * *